C. W. AND J. T. KEMPER.

CABLE CLAMP.

APPLICATION FILED APR. 7, 1921.

Reissued Feb. 21, 1922. 15,290.

INVENTORS.

Charles W. Kemper

John T. Kemper

By Clarke & Dodge attorneys

UNITED STATES PATENT OFFICE.

CHARLES W. KEMPER AND JOHN T. KEMPER, OF ALAMEDA, CALIFORNIA.

CABLE CLAMP.

15,290. Specification of Reissued Letters Patent. Reissued Feb. 21, 1922.

Original No. 1,366,007, dated January 18, 1921, Serial No. 304,877, filed June 17, 1919. Application for reissue filed April 7, 1921. Serial No. 459,416.

*To all whom it may concern:*

Be it known that we, CHARLES W. KEMPER and JOHN T. KEMPER, citizens of the United States, residing at Alameda, formerly of Oakland, in the county of Alameda, State of California, have invented a new and useful Cable Clamp; and we do hereby declare the following to be a full, clear, and exact description of the invention, such as will enable others skilled in the art to which it appertains to make and use the same.

The invention relates to clamps, and has for its object to provide a clamp particularly adapted for clamping overlapping ends or strands of cables within a sleeve or housing, and to provide the ends of said housing at opposite sides of the cables with chambers having their outer edge walls formed at an acute inwardly converging angle to said cables and their bearing faces, thereby forming a contact surface for jamming rollers which are adapted to jam between the walls of the chambers and the outer faces of the cables, said cables, by means of said rollers, being prevented from longitudinal movement and at the same time the said rollers forcing the strands of the two contacting cables into interlocking engagement.

A further object is to provide the side faces with apertures through which the rollers may be placed within the chambers and through which said rollers may be removed, also to provide the outer ends of the chambers with walls for preventing the rollers from dropping out of the open ends of the housing member.

A further object is to provide apertures in the body member and in alinement with said rollers, thereby allowing the insertion of an instrument for breaking the jam of the rollers, thereby releasing the cables.

A further object is to form the inner cable-engaging faces of the edge walls at opposite sides of the housing chamber in parallel relation to and with their inner terminals substantially opposite each other, said inner terminals merging into the inner terminals of the oppositely disposed converging roller-bearing faces of the housing.

The present invention is an improvement over and this application is in certain respects a continuation of the subject matter of our prior Patent No. 1,271,912, issued July 9, 1918.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

Figure 1:
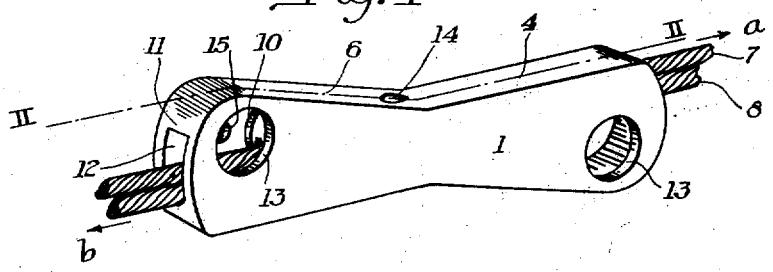
Fig. 1 is a perspective view of the clamp showing the same applied to overlapping cable ends.

Referring to the drawings, the numeral 1 designates the body or housing member, which housing member is preferably cast or otherwise formed in one piece of any kind of metal desired. The housing member 1 is formed with chambers 3, 3, at its ends, which provide cavities for the cables and their holding rollers. The chambers 3, 3, have one of their walls 4, which are on alternate opposite sides of the housing member from and in parallel relation to each other, their inner ends terminating substantially opposite each other at the narrowest middle portion of the housing, said walls 4 being preferably provided with indentations 5 of standard size and of standard pitch for the reception of the strands of standard cables. The walls 4 merge into walls 6, the inner roller bearing faces 9 of which are at acute angles to the longitudinal cables 7 and 8 and the bearing faces 5 therefor. The walls 6 with walls 4 and the inserted cables form triangular shaped roller chambers 3 for the reception of rollers 10, which rollers 10 are adapted to contact with the inner converging faces 9 of walls 6 and the adjacent cable 7 or 8. The outer ends of the walls 6 are provided with inwardly extending portions 11, which prevent the rollers from coming out of the cable openings 12, that is when the cables are in position within the body member.

Figure 2:
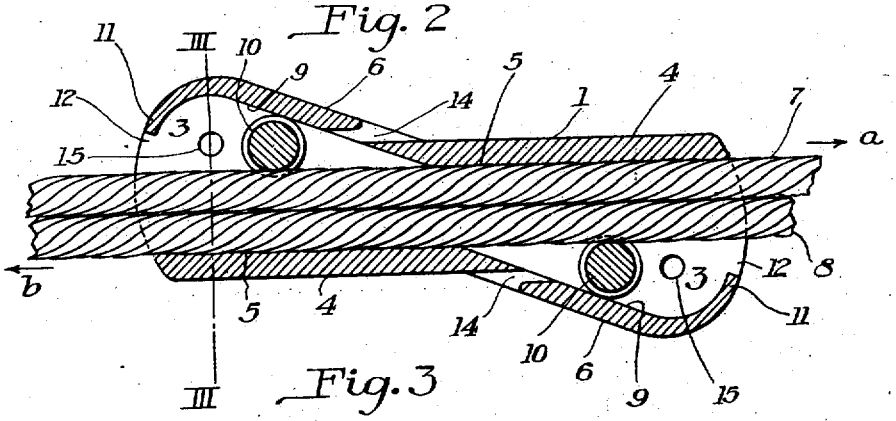
Fig. 2 is a longitudinal sectional view taken on line 2—2 of Fig. 1.
Figure 3:
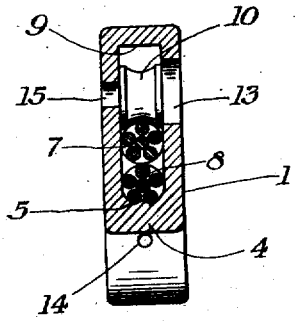
Fig. 3 is a vertical sectional view taken on line 3—3 of Fig. 2.

When it is desired to clamp the overlapping portions of the cables 7 and 8, they are passed through the body member until they assume positions similar to that shown in Fig. 2; then rollers 10 are placed within the chambers 9 by passing the same transversely through the apertures 13 in one of the side walls of the body member. It will be seen that the roller will be prevented from dropping out of the body member by the inturned walls 11. The rollers 10 being within the chambers 9 are then forced inwardly toward each other until their peripheries engage the sloping inner faces 9 of walls 6 and the adjacent cables. Then as the strain on the cables is in the opposite direction of the arrows *a* and *b*, said cables will be prevented from moving or slipping by said rollers, which will cause the cables to be thoroughly jammed against each other at both ends of the housing member and also against the corrugated faces 5 of edge walls 4, thereby providing a double jamming of the cables upon each other and also against the walls 4 of chambers 3, 3. By terminating the faces 5 of walls 4 substantially opposite to each other, it will be impossible for that portion of the cables 7 and 8 which is disposed between the rollers 10 to become slack if the strain is temporarily relieved from the cables. It also prevents any slack between said rollers when placing the clamp in position. When it is desired to remove the clamp, a tool or drip pin may be inserted in the apertures 14, which apertures will guide said drip pin into contact with the rollers 10 so that they may be driven toward the ends of the chambers and the jam on the rope broken. When it is desired to remove the rollers from the chambers 3, 3, an instrument may be inserted through the aperture 15 for facilitating the removal of the rollers through the apertures 13.

A feature of special advantage in our present clamp using an integral housing is that all of the several parts of the housing are in fixed relation to each other, so that when the rollers and cables are in gripping position, they are not only clamped tightly together throughout the length of the housing, but the engaging faces 5, 5, of the housing are together co-extensive in length with the enclosed cable sections. This ensures positive and extremely tight engagement throughout, increasing with the tension, and is due to the unvarying relation between the surfaces 5 and 5, 9 and 9, and of course between the surfaces 5 and 9, in connection with the roller action on surfaces 9.

What we claim is:

1. A cable clamp comprising a fixed housing having inwardly tapering communicating cavities formed between relatively stationary walls terminating about midway of the clamp, one wall of each cavity being laterally off-set but parallel with the corresponding wall of the other cavity and providing bearing faces for a pair of inserted contacting cables, the other wall of each cavity converging inwardly with relation to its opposite wall, and a gripping roller in each cavity adapted to engage said converging wall and an adjacent cable and to force it against a companion cable in gripping resistance to longitudinal strains in opposite directions.

2. A cable clamp comprising a fixed housing having inwardly tapering communicating cavities formed between relatively stationary walls, one wall of each cavity being laterally off-set but parallel with the corresponding wall of the other cavity and providing bearing faces for a pair of inserted contacting cables, the other wall of each cavity converging inwardly with relation to its opposite wall, and a gripping roller in each cavity adapted to engage said converging wall and an adjacent cable and to force it against a companion cable in gripping resistance to longitudinal strains in opposite directions, and an inwardly deflected roller-retaining portion at each end of the clamp.

3. A cable clamp consisting of an integral open-ended housing having side and edge walls, the inner faces of the edge walls converging toward a middle communicating opening and providing alternate parallel laterally spaced cable bearing faces and opposed roller bearing faces extending outwardly therefrom, and gripping rollers therein, the edge wall of each roller bearing face having an inwardly turned roller retaining terminal.

4. A cable clamp consisting of an integral open-ended housing having side and edge walls, the inner faces of the edge walls converging toward a middle communicating opening and providing alternate parallel laterally spaced cable bearing faces and opposed roller bearing faces extending outwardly therefrom, and gripping rollers therein, the edge wall of each roller bearing face having an opening therethrough for the insertion of a releasing pin.

5. A cable clamp consisting of an integral open-ended housing having side and edge walls, the inner faces of the edge walls converging toward a middle communicating opening and providing alternate parallel laterally spaced cable bearing faces and opposed roller bearing faces extending outwardly therefrom, and gripping rollers therein, the edge wall of each roller bearing face having an opening therethrough behind the roller gripping position for the insertion of a releasing pin.

6. A cable clamp consisting of a fixed housing having inwardly tapering communicating cavities formed between relatively stationary side and edge walls, the inner faces of the edge walls converging towards a middle communicating opening providing alternate parallel laterally spaced cable bearing faces and opposed roller bearing faces, one of the side walls at each end portion having a roller insertion opening, and a gripping roller in each of said cavities.

7. A cable clamp comprising a body member, said body member having a chamber extending longitudinally therethrough for the reception of cables, triangular shaped pockets in communication with the longitudinal chamber, the apexes of said triangular shaped pockets extending toward each other, the enlarged ends of said pockets being substantially closed, apertures in the side walls of the body member and in communication with said pockets, rollers adapted to be passed through said apertures and into jamming positions within the triangular shaped pockets and apertures in the walls and in communication with the pockets and so positioned that a tool passing through the same would engage the rollers thereby providing means whereby said rollers may be released.

8. A cable clamp comprising a body member, said body member having a chamber extending longitudinally therethrough for the reception of cables, triangular shaped pockets in communication with the longitudinal chamber, the apexes of said triangular shaped pockets extending toward each other and terminating substantially centrally of the longitudinal chamber, the enlarged ends of said pockets being substantially closed, apertures in the body member and in communication with the pockets, and rollers adapted to be passed through said apertures and into jamming positions in the apexes of the triangular shaped pockets when cables are disposed in said longitudinal chamber.

9. A cable clamp comprising a body member, said body member having a chamber extending longitudinally therethrough for the reception of cables, triangular shaped pockets in communication with the longitudinal chamber, the apexes of said triangular shaped pockets extending toward each other, the enlarged ends of said pockets being substantially closed, apertures in the side walls of the body member and in communication with said pockets, rollers adapted to be passed through said apertures and into jamming positions within the triangular shaped pockets, apertures in the walls and in communication with the pockets and so positioned that a tool may be passed through the same for breaking the jam of the rollers, and apertures for the reception of a tool for forcing the rollers through the first mentioned apertures in communication with the pockets.

In testimony whereof we hereunto affix our signatures.

CHARLES W. KEMPER.
JOHN T. KEMPER.